United States Patent
Bryant et al.

(10) Patent No.: US 12,437,327 B2
(45) Date of Patent: Oct. 7, 2025

(54) SYSTEMS, METHODS, AND APPARATUSES FOR DYNAMIC GENERATION OF QUOTE DATA OBJECTS USING MACHINE LEARNING

(71) Applicant: GP Building Products Services LLC, Atlanta, GA (US)

(72) Inventors: Graham Bryant, Watkinsville, GA (US); Eliana Estrada, Smyrna, GA (US); Sasanka Gandavarapu, Atlanta, GA (US); Scott Jones, Griffin, GA (US); Dave Klekamp, Atlanta, GA (US); Alex Lockwood, Avondale Estates, GA (US); Varsha Monick, Atlanta, GA (US); Jon Moss, Atlanta, GA (US); Dade Pendergraft, Atlanta, GA (US); Karthikeyan Ramasamy, Atlanta, GA (US); Roshan Shah, Atlanta, GA (US)

(73) Assignee: GP Building Products Services LLC, Atlanta, GA (US)

( * ) Notice: Subject to any disclaimer, the term of this patent is extended or adjusted under 35 U.S.C. 154(b) by 27 days.

(21) Appl. No.: 18/027,123

(22) PCT Filed: May 5, 2022

(86) PCT No.: PCT/IB2022/054166
§ 371 (c)(1),
(2) Date: Mar. 20, 2023

(87) PCT Pub. No.: WO2022/238823
PCT Pub. Date: Nov. 17, 2022

(65) Prior Publication Data
US 2023/0334544 A1 Oct. 19, 2023

Related U.S. Application Data

(60) Provisional application No. 63/337,322, filed on May 2, 2022, provisional application No. 63/188,613, filed on May 14, 2021.

(51) Int. Cl.
*G06Q 30/00* (2023.01)
*G06N 3/045* (2023.01)
(Continued)

(52) U.S. Cl.
CPC ......... *G06Q 30/0611* (2013.01); *G06N 3/045* (2023.01); *G06N 3/08* (2013.01);
(Continued)

(58) Field of Classification Search
CPC .................................................. G06Q 30/0611
See application file for complete search history.

(56) References Cited

U.S. PATENT DOCUMENTS 10,467,695 B1 * 11/2019 Zitzewitz ............... G06Q 40/04
2009/0132270 A1 * 5/2009 Baptiste ............. G06Q 30/0283
705/347

(Continued)

FOREIGN PATENT DOCUMENTS

CA 2870442 A1 5/2016

OTHER PUBLICATIONS

Lawrence, Richard D. "A machine-learning approach to optimal bid pricing." Computational modeling and problem solving in the networked world: Interfaces in computer science and operations research (2003): 97-118.*

(Continued)

*Primary Examiner* — Kathleen Palavecino

(57) ABSTRACT

Embodiments provide for dynamic generation and updating of quote data objects using machine learning. An example apparatus is configured to receive a quote request and parse the quote request to extract one or more quote parameters. The example apparatus is further configured to determine, based at least in part the one or more quote parameters and by querying a plurality of repositories that are each updated periodically or in real-time, available inventory associated (Continued)

with the product identifier, and to determine a set of alternative quote values for the product identifier. The example apparatus is further configured to generate, using a first trained machine learning model and based at least in part on the available inventory and the set of alternative quote values, a first quote feature for the quote request and a confidence score, and to cause transmission of a quote data object to a user device.

20 Claims, 8 Drawing Sheets

(51) Int. Cl.
*G06N 3/08* (2023.01)
*G06Q 30/0201* (2023.01)
*G06Q 30/0601* (2023.01)
*G06Q 50/06* (2012.01)

(52) U.S. Cl.
CPC ..... *G06Q 30/0206* (2013.01); *G06Q 30/0605* (2013.01); *G06Q 50/06* (2013.01)

(56) References Cited

U.S. PATENT DOCUMENTS

| | | |
|---|---|---|
| 2009/0240602 A1 | 9/2009 | Mohr et al. |
| 2019/0244267 A1* | 8/2019 | Rattner ................. G06N 20/00 |
| 2020/0372499 A1 | 11/2020 | Sundaram et al. |
| 2020/0380573 A1 | 12/2020 | Shoshan |

OTHER PUBLICATIONS

International Search Report and Written Opinion received for PCT Application No. PCT/IB2022/054166, mailed on Aug. 2, 2022, 11 pages.

* cited by examiner

SYSTEMS, METHODS, AND APPARATUSES FOR DYNAMIC GENERATION OF QUOTE DATA OBJECTS USING MACHINE LEARNING

CROSS-REFERENCE TO RELATED APPLICATIONS

The present application is a U.S. National Phase entry of PCT Application No. PCT/IB2022/054166, filed May 5, 2022, which claims priority to and the benefit of U.S. Provisional Application No. 63/188,613, filed May 14, 2021, and priority to and the benefit of U.S. Provisional Application No. 63/337,322, filed May 2, 2022, the contents of all of which are hereby incorporated by reference in their entirety.

BACKGROUND

Certain types of products, such as building products for construction projects, and other commodity type products that may be purchased in bulk amounts are typically purchased manually via interaction between a buyer and a broker or other seller. The process to purchase such items generally includes obtaining quotes for a product from several brokers and/or mill suppliers. To produce the quotes, the brokers and/or mill suppliers (e.g., mill salespersons) may rely on intuition and experience gathered over several years rather than a data-based recommendation. However, such processes may not only create downstream issues (e.g., oversold inventory, delivery logistics issues, or the like) but may also not adequately account for rapidly changing market conditions. Accordingly, automated quote generation and order management for building products using machine learning may be desired.

BRIEF SUMMARY

According to another exemplary embodiment, a method is provided. The method includes the steps of: determining, by one or more computer processors coupled to memory, a request for a quote for a first building product; determining available inventory of the first building product; determining a set of customer alternative price values for the first building product; generating, using a first machine learning algorithm and based at least in part on the available inventory and the set of customer alternative price values, a first price value for the quote of the first building product; and causing a message to be sent to a user device, the message comprising the quote, an expiration time, and a purchase option to trigger purchase of the first building product.

According to an exemplary embodiment, a system is provided. The system includes memory configured to store computer-executable instructions; and at least one computer processor configured to access the memory and execute the computer-executable instructions to: determine a request for a quote for a first building product; determine available inventory of the first building product; determine a set of customer alternative price values for the first building product; generate, using a first machine learning algorithm and based at least in part on the available inventory and the set of customer alternative price values, a first price value for the quote of the first building product; and cause a message to be sent to a user device, the message comprising the quote, an expiration time, and a purchase option to trigger purchase of the first building product.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF VARIOUS EMBODIMENTS

1. Overview

Figure 1A:
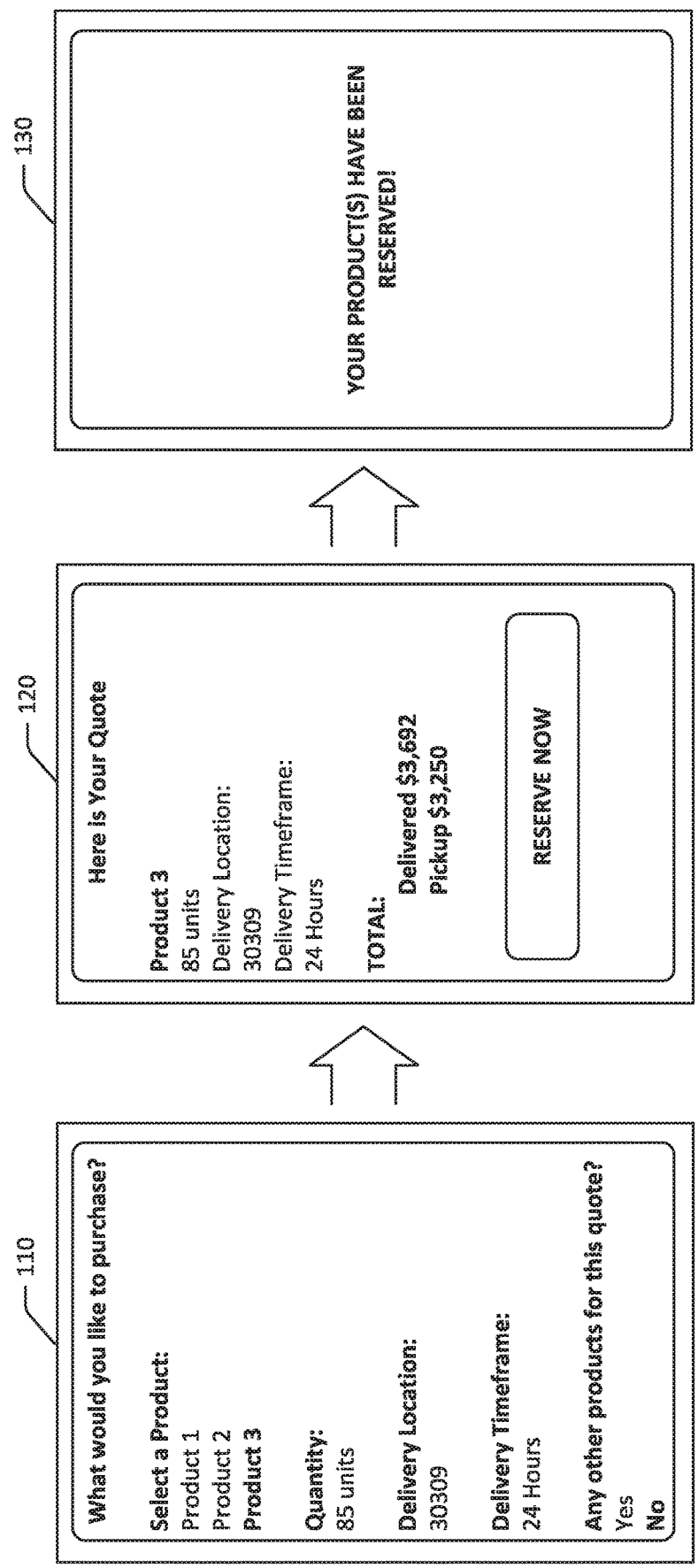
FIG. 1A is a schematic illustration of an example use case for automated quote generation and order management for building products in accordance with one or more example embodiments of the disclosure.

Commercial and residential building products may be commodity type products that are purchased in bulk quantities. For example, an order for a construction project may include several truckloads of lumber. In some instances, such orders may be placed over the phone, and delivery of such building products may be requested within a certain time interval, due to limited storage availability at construction sites. To complete transactions over the phone, a buyer may call multiple sellers and request quotes for a particular type of product. The individual sellers may manually produce quotes and deals may be completed over the phone. This process may be time consuming, and by the time a buyer decides to make a purchase, the price or quantity provided in a quote may no longer be available and/or adequately account for rapidly changing market conditions.

The manual process of generating a quote for a product may include estimations as to product availability, delivery timing and availability, delivery costs, forecasted production, and other factors, which can lead to erroneous and suboptimal quotes. In addition, a human operator may be unable to evaluate all relevant factors in determining a quote or may not even be aware of the factors to consider when providing a quote for a particular building product.

In contrast, embodiments of the disclosure utilize artificial intelligence to generate automated quotes for building products, and for automated management of generated quotes, so as to reduce quote generation time and increase accuracy. Some embodiments may also utilize artificial intelligence to generate automated offers and/or pricelists for building products, which may be provided to users without specific requests for the offer. Embodiments may automatically manage generated quotes via dynamic quote expiration times and automated monitoring of outstanding quotes. Some embodiments may generate messages that provide a quote and allow for a quick (e.g., one-click or two-click, etc.) purchase or acceptance of the quote via email or other messaging platform, thereby automating the end-to-end process. Certain embodiments may permit partial acceptance of the generated quotes, in addition to acceptances in full. For example, in the case of pricelists, a recipient of the automated offers and/or pricelists (whether in response to request therefor or not) may choose certain products for purchase from a menu of products offered. In this way, as detailed elsewhere herein, one or more truckloads may be build from the list, informed by which certain embodiments will dynamically manage the price, volume, and availability of the products on the lists.

This disclosure relates to, among other things, devices, systems, methods, computer-readable media, techniques, and methodologies for automated quote generation and order management for building products. Certain embodiments may automatically generate quotes for building products using one or more machine learning algorithms. For example, some embodiments may utilize one or more algorithms configured to analyze various factors, such as available inventory, forecasted demand, forecasted availability, estimated customer alternative pricing scenarios, and/or other factors. Although discussed in the context of quotes provided in response to requests for quotes, embodiments of the disclosure may be configured to generate offers with pricing for users, where the offers are provided to users without express requests for an offer or for pricing of any particular product. In some instances, machine learning (e.g., which may optionally include one or more of deep neural networks, long short term memory units and/or recurrent neural networks, etc.) may be used to identify various elements of metadata that can be used to optimize quote generation and quote management functionality over time. Some embodiments may utilize machine learning algorithms configured to ingest historical order data (e.g., customer, buyer, fulfillment center location, delivery location, customer business type, sales product identifier, footage, last order variance, historical purchasing patterns (frequency and or volume), historical purchase mix (basket of products), historical quote mix (basket of products), hit rate (order volume divided by quote volume), etc.), along with market predictions (e.g., determined using one or more predictive machine learning models, etc.), and/or other data, so as to output a price value for a quote. Certain embodiments may include a pair of neural networks in communication with each other, so as to individually improve over time during a training phase. Some embodiments may utilize customer segmentation to classify individual customers in different categories, so as to predict various factors, such as likelihood to purchase, price sensitivity, and/or other factors. For example, based at least in part on a customer's past purchasing history, which may include a win loss ratio, frequency of purchase, prices paid relative to quote or asking price, company size, and/or other historical data, a customer may be classified into one or more customer segments. Further, data related to demand for a particular product, such as purchase patterns over a time interval (e.g., the past week, month and/or year, etc.) may be used for pricing generation.

Referring to FIG. 1A, an example use case 100 for automated quote generation and order management for building products in accordance with one or more example embodiments of the disclosure. In FIG. 1A, a first user interface 110 depicts an example user interface at which a user may input information as part of a quote request process. For example, the first user interface 110 may include a product selection input, quantity information, delivery location information, a delivery timeframe or window, and/or other inputs. Other user interfaces may have different inputs. After the request for quote is submitted, a quote generation engine may be executed by one or more remote servers to determine a quote that includes pricing for the requested product(s). As described with respect to FIGS. 2A-B and 3, the quote generation engine may implement one or more machine learning algorithms to generate the quote and may utilize a number of ingested factors as described in detail with respect to FIGS. 2A-B and 3. At a second user interface 120, the automatically generated quote may be presented. The quote may include information such as a price value for delivery, a price value for pickup, and/or other information. The quote may be sent as part of a message that includes a "buy now" or "build load" option that can be implemented as a one-click or two-click purchase or reservation option (e.g., where "clicks" refer to user interactions and can be taps, selections, swipes, etc.). The user may select the purchase option, and a third user interface 130 may be presented confirming the reservation or purchase. In this manner, a user may receive and accept a quote quickly and with reduced errors and increased confidence that the delivery will occur according to shared expectations (customer and seller).

To generate automated quotes using machine learning, some embodiments may include a quote generation engine. The quote generation engine may include one or more machine learning algorithms that may be used to analyze various factors and to generate a corresponding price value for a quote. The quote generation engine may optionally extract customer alternative sourcing estimates (benchmark pricing estimates, freight estimates) data to determine price values, and may receive feedback signals related to conversion events to improve future performance. The quote generation engine may generate a vector that combines the considered features for a quote. The quote generation engine may input the vector into a second machine learning algorithm, such as a temporal neural network. The second machine learning algorithm may output actions to manage outstanding quotes over time to manage oversold inventory and other issues that may arise.

To generate automated quotes using machine learning, an example process flow 140 is presented and may be performed, for example, by one or more quote generation engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 140 of FIG. 1B.

At a first block 150, a request for a quote for one or more building products may be received or generated. For example, a user may send a request to the server using the first user interface 110. As another example, certain embodiments may be configured, via machine learning modules or otherwise (as detailed elsewhere herein) to automatically generate quotes for building products in a proactive manner, without reliance upon receipt of a request from a user or otherwise. At a second block 160, quote parameters may be determined. For example, the server may parse the request to determine a product identifier, a desired quantity, a delivery destination, and so forth. The server may determine a set of competitors for which inventory and/or pricing data is to be estimated or modeled. At a third block 170, a price value for the quote may be dynamically determined based on the quote parameters. For example, the server may implement a machine learning algorithm configured to output price values based on the input parameters. The machine learning algorithm may include a predictive model configured to predict demand and/or customer alternative pricing estimate for the building product. The machine learning algorithm may include a probabilistic model configured to determine a likelihood that the quote will be converted to a transaction. In some embodiments, the machine learning algorithm may be stored at one or more servers and may be executed across a number of server or computer processors. At a fourth block 180, a message that includes the quote and an option to purchase may be sent. For example, the server may send a message with the quote to a user account or user device associated with the request for quote. In some embodiments, a two-click or two-interaction option may be sent. For instance, a "buy now" option may be presented as part of a message, and interaction with the buy now option may lead to a user interface at which the user can complete the purchase via a second interaction.

Figure 1B:
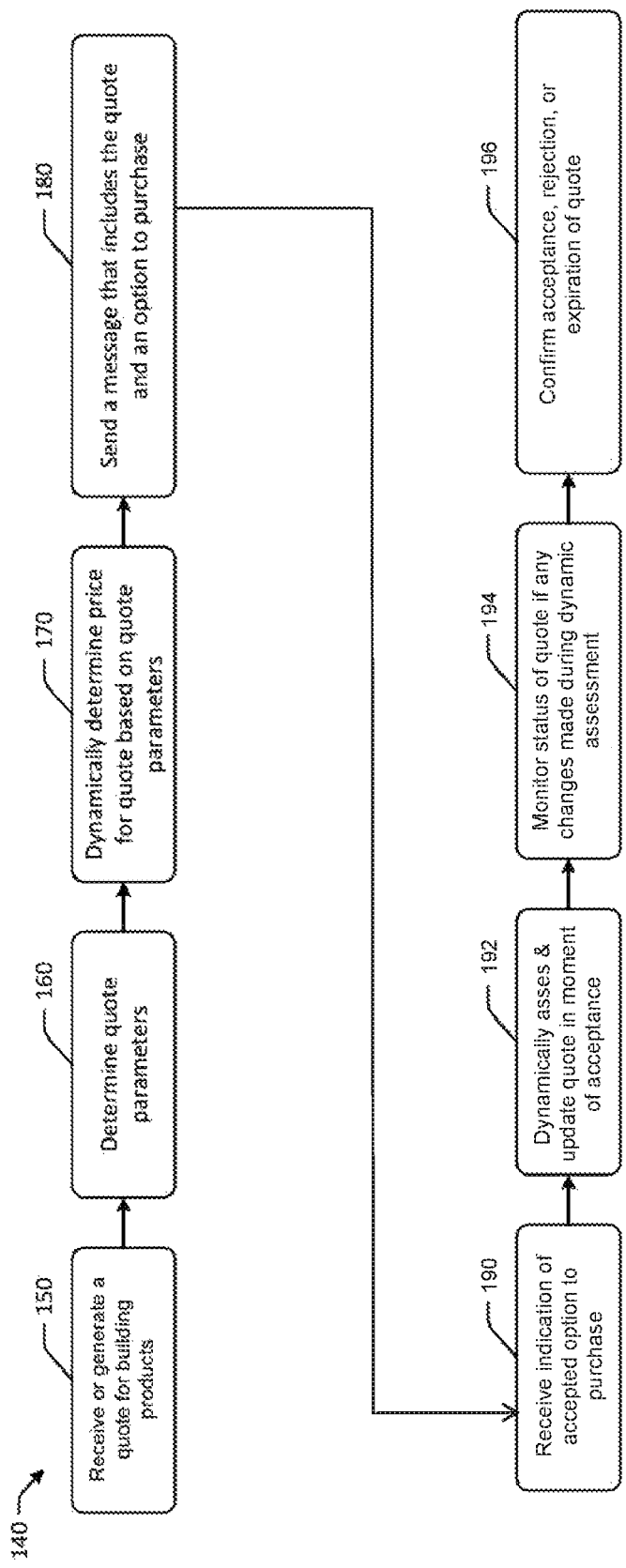
FIG. 1B is schematic illustration of a high-level and example process flow for automated quote generation and order management for building products in accordance with one or more example embodiments of the disclosure.

Remaining with FIG. 1B, at a fifth block 190 according to various embodiments, a message or indication of a user accepting an option to purchase may be received, based upon either a two-click or two-interaction option, a buy-now option, or otherwise. In the moment of acceptance or substantially around the same, according to certain embodiments, the sixth block 192 may dynamically assess the original quote to determine any updates that may be required. For example, in the moment of acceptance and in block 192, the system can individually or bulk update one or more of expiration dates, price, volume, or availability, relative to preset and/or custom parameters or the like. The machine learning algorithm's probabilistic model can be further updated according to dynamic adjustments made in this manner, so as to predict and/or otherwise proactively manage dynamic updates in the moment of acceptance.

At seventh block 194 according to various embodiments, the system may provide the updated parameters and/or quote to the user and monitor status thereof, for example to determine whether the user takes any additional action in real-time or otherwise upon the dynamically updated quote. In eighth block 196, acceptance, rejection, and/or expiration of the dynamically updated quote may be confirmed according to various embodiments. The process between fifth and eighth blocks 190-196 may be advantageous, in accordance with certain embodiments, where market conditions or other external factors may influence (adversely or otherwise) price, availability, or the like. In these and other embodiments, where an originally generated quote becomes out of sync with one or more of these parameters, acceptance of the original quote is but a first step toward fulfillment, subject to potential adjustments as appropriate.

The systems, methods, computer-readable media, techniques, and methodologies for creating neural networks and/or implementing machine learning algorithms that can be used to generate quotes and manage outstanding quotes may result in optimal and/or improved pricing and accuracy of delivery capability. In some embodiments, the machine learning algorithm may be used to predict quote conversion, improve user interaction event volume with certain products, and the like. Certain embodiments may use one or more detection modules or algorithms (e.g., pricing detection modules, pattern recognition algorithms, etc.) to identify or detect the presence of one or more features in datasets. Features may include, for example, the presence of certain values, the occurrence of certain actions or events, certain contextual patterns (e.g., time, date, weather, season, etc.). In some instances, a module may perform more than one form of analysis.

Example embodiments of the disclosure provide a number of technical features or technical effects. For example, in accordance with example embodiments of the disclosure, certain embodiments of the disclosure may automatically analyze and/or ingest datasets and determine quotes. Certain embodiments may determine dynamic quote expiration times, dynamic pricing and/or product availability updates based upon a variety of parameters (e.g., new data, new sales, new market conditions), select quotes for automated expiration, and the like. Certain embodiments may recognize or identify presence of certain features in data using one or more machine learning modules or algorithms. As a result of improved functionality, quotes for building products can be generated. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

2. Illustrative Processes and Use Cases

Figure 2A:
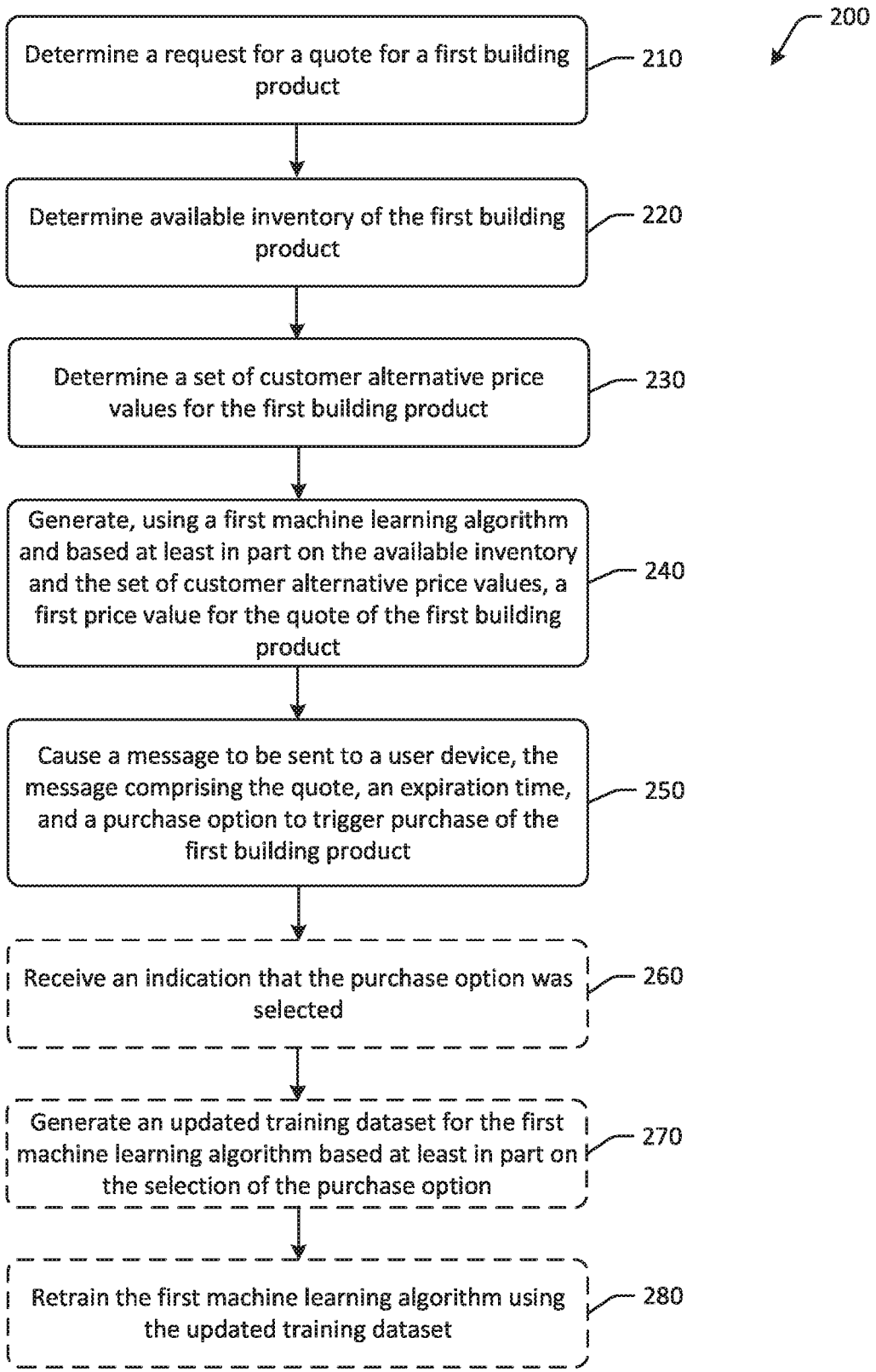
FIG. 2A is another schematic illustration of an example process flow for automated quote generation and order management for building products in accordance with one or more example embodiments of the disclosure.

FIG. 2A depicts an example process flow 200 for automated quote generation and order management for building products in accordance with one or more example embodiments of the disclosure. While example embodiments of the disclosure may be described in the context of building products, it should be appreciated that the disclosure is more broadly applicable to any type of bulk commodity or over-sized goods transactions and delivery logistics. Some or all of the blocks of the process flows in this disclosure may be performed in a distributed manner across any number of devices. Some of the operations of the process flow 200 may be optional and may be performed in a different order.

At block 210 of the process flow 200, computer-executable instructions stored on a memory of a device, such as a remote server or a user device, may be executed to determine a request for a quote for a first building product. For example, a quote generation engine and/or one or more quote generation modules at a remote server may determine a request for a quote for a first building product. In some embodiments, a user may request a quote for a first building product via a user interface presented at a user device; in other embodiments, the quote generation modules may operate proactively so as to generate a quote without first receiving a user-initiated request. The first building product may be any building product in bulk quantity, such as a residential construction building product, a commercial construction building product, or another type of building product. In some embodiments, the first building product may be a construction product such as a gypsum product, a structural support product, a roofing product, or another type of construction product. The first building product may be associated with a quantity that may be included as part of the request or may be sent separately from the request. The quantity may be a bulk quantity, or a quantity that is greater than that which may be used for personal projects or by individuals. The user may input a desired quantity of the first building product at the user interface when making a selection of the first building product or at a different user interface. The desired quantity may be included in the request sent to the server or may be sent as a separate communication.

At block 220 of the process flow 200, computer-executable instructions stored on a memory of a device, such as a remote server or a user device, may be executed to determine available inventory of the first building product. For example, the quote generation engine and/or one or more quote generation modules at a remote server may determine available inventory of the first building product. To determine the available inventory of the first building product, the server may query one or more databases in communication with the server. For example, inventory of the first building product that is available at various mills, store locations, or other fulfillment centers may be reflected in one or more databases that may be updated periodically or in real time as product is sold. The inventory may be determined for a specific geographic region. For example, a zip code or other geographic region identifier associated with the request may be determined, and inventory that is available within a predetermined distance of the geographic region identifier may be determined by querying the database(s) for inventory at locations within the predetermined distance. In other embodiments, all available inventory may be determined regardless of distance from the geographic region identifier associated with the request. The available inventory may reflect the amount of the first building product that is available for purchase.

In some embodiments, the server may determine a destination associated with the request for the quote. The destination may be a shipping address, the geographic region identifier, or another destination identifier. The server may determine the available inventory of the first building product by determining available inventory of the first building product at fulfillment centers within a predetermined distance of the destination, such as a truck delivery distance of 100 miles, a same day delivery distance of 50 miles, a distance of 250 miles, or another suitable distance.

Remaining with FIG. 2A, at block 230 of the process flow 200, computer-executable instructions stored on a memory of a device, such as a remote server or a user device, may be executed to determine a set of estimated customer alternative or forecasted customer alternative price values for the first building product. For example, the quote generation engine and/or one or more quote generation modules at a remote server may determine a set of estimated customer alternative price values (estimated competitor product prices and estimated competitor delivered freight prices) for the first building product. In some embodiments, the server may be configured to determine a set of competitors that provide the first building product. The set of competitors may include competitors that provide the first building product. The server may determine a public web address, industry publication, or other portal through which a determination can be made as to whether a particular competitor provides the first building product. In some embodiments, the server may be configured to automatically analyze hit rates, which may be represented by wins and losses with respect to conversion of quotes, along with optional market data to predict general inventory availability in the market at a particular time to determine the availability of customer alternatives and may forego analysis of any particular supplier inventory.

In some instances, the server may be configured to determine which, if any, of the set of competitors has the first building product in stock or as available inventory. The server may be configured to filter the set of competitors so as to determine price values only for those competitors that are predicted to have the first building product in stock. The server may optionally determine an estimated shipping charge for the first building product at one or more of the set of competitors via prediction of shipping costs at market rates. The estimated or exact shipping charge may be included in the competitor price value for the particular competitor.

At block 240 of the process flow 200 shown in FIG. 2A, computer-executable instructions stored on a memory of a device, such as a remote server or a user device, may be executed to generate, using a first machine learning algorithm, which may be a neural network, and based at least in part on the available inventory and the set of estimated customer alternative price values, a first price value for the quote of the first building product. For example, the quote generation engine and/or one or more machine learning algorithms at a remote server may generate, using a first machine learning algorithm and based at least in part on the available inventory and the set of estimated customer alternative price values, a first price value for the quote of the first building product. The first machine learning algorithm may be configured to automatically generate the first price value for the quote of the first building product. The first price value for the quote may be the price to be presented to the user responsive to the request and may represent pricing for the desired quantity of the first building product. To determine the first price value, the first machine learning algorithm may ingest the available inventory information, the estimated customer alternative price value(s), and/or other data, and may output the first price value. The first price value may change depending on how much inventory is available, how long inventory may take to be replenished, the estimated customer alternative price value(s), and/or other factors. The first machine learning algorithm may be configured to dynamically determine the first price value without manual input, in some embodiments. The first machine learning algorithm may be configured to determine the first price value while automatically taking into consideration other factors, such as contextual factors, which may cause an increase or decrease to the first price value.

In some embodiments, the first machine learning algorithm may ingest an output from a second machine learning algorithm, which may be a neural network, that may be used by the first machine learning algorithm to determine the first price value. The second machine learning algorithm may be configured to determine a likelihood of purchase for the first building product by the user. The likelihood of purchase may be used by the first machine learning algorithm to determine the first price value. For example, the greater the likelihood of purchase, the greater the first price value may be (or, conversely, the lower the first price value may be). The second machine learning algorithm may therefore be used to determine a likelihood of purchase for the first building product, and the first price value may be generated using the first machine learning algorithm based at least in part on the available inventory, the set of estimated customer alternative price values, and the likelihood of purchase.

To determine the likelihood of purchase, the second machine learning algorithm may be configured to ingest data related to the user account associated with the request, such as historical purchase data, estimated competitor inventory availability, expected sales data, local construction project data, the first price value, and/or other data. The second machine learning algorithm may then determine the likelihood of purchase that reflects current market availability and accounts for pricing differences between the first price value and any estimated customer alternative price values.

Although described as two separate machine learning algorithms in communication with each other, other embodiments may include an additional or fewer number of machine learning algorithms and may be configured such that the machine learning algorithms perform different functionality.

At block 250 of the process flow 200 of FIG. 2A, computer-executable instructions stored on a memory of a device, such as a remote server or a user device, may be executed to cause a message to be sent to a user device, the message comprising the quote, an expiration time, and a purchase option to trigger purchase of the first building product. For example, a quote generation engine and/or one or communication modules at a remote server may cause a message to be sent to a user device, the message comprising the quote, an expiration time, and a purchase option to trigger purchase of the first building product. In response to the quote, the server may determine the first price value and may generate a message that includes the first price value as the quote, along with an optional expiration time, and a purchase option to initiate or complete purchase of the first building product.

In some embodiments, the server may be configured to generate or otherwise determine the expiration time. The expiration time may be a point in time after which the quote may no longer be valid. In some instances, the expiration time may be static, such as a certain length of time (e.g., 24 hours, etc.) regardless of the product type, or may be different for different product types.

In other instances, the expiration time may be dynamic. For example, the server may determine a dynamic expiration time for individual quotes. The dynamic expiration time may be determined based at least in part on the number of outstanding quotes at the time the message and/or first price value is generated, the value of some or all the outstanding quotes, market conditions, and/or other factors. For example, if a relatively large number of outstanding quotes has been generated by the server or a related computer system, for the first building product and/or other building products, the dynamic expiration time may be less than if a relatively fewer number of quotes are outstanding. Outstanding quotes may be quotes generated by the system that have not yet been accepted or rejected.

In some embodiments, the message may include a field for the first price value or quote that can be dynamically updated. For example, the quote displayed in association with the message may be configured to be periodically updated, such as after the expiration time of the quote, price change, and/or availability (e.g., volume) change. This may allow for added functionality, such as providing an updated quote for the user to view without having to input or generate another request for quote; in the instances of changes in availability, changes in quantity, and/or changes in price The user may complete a purchase of the first building product via the purchase option in the message. For example, the purchase option may be a one-click or two-click purchase function that allows users to accept the quote via the message and does not require, in some instances, additional user input beyond interaction with the purchase option. Accordingly, in some embodiments, the purchase option may be a one-click purchase option, thereby providing a seamless purchase experience for the user. Selection of the purchase option may cause the user device to automatically send a user account identifier to the server to complete the purchase.

At optional block 260 of the process flow 200, computer-executable instructions stored on a memory of a device, such as a remote server or a user device, may be executed to receive an indication that the purchase option was selected. For example, the user may select the purchase option, and the user device may send an indication that the purchase option was selected. Selection of the purchase option may initiate and/or complete the purchase of the first building product.

Figure 2B:
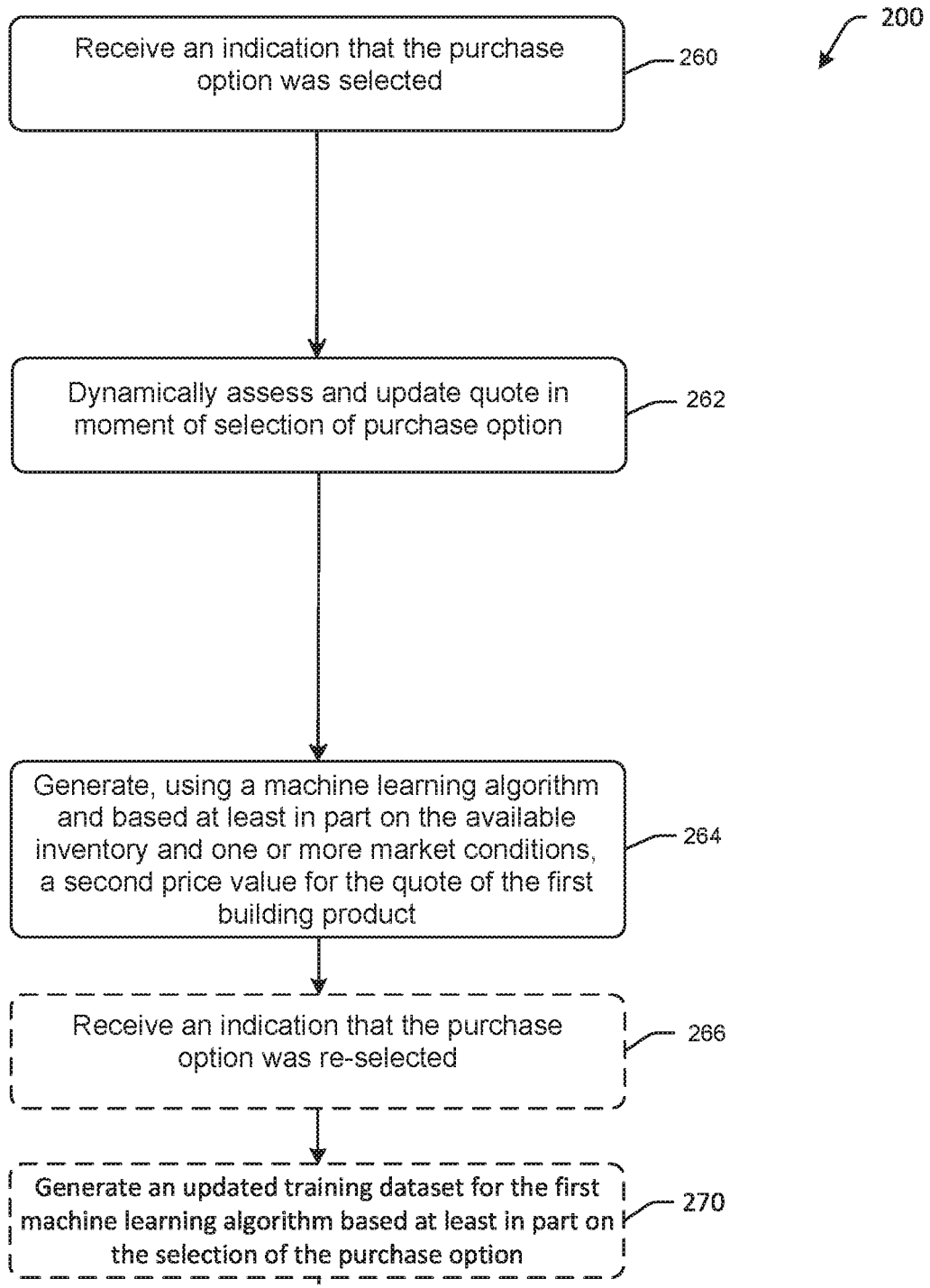
FIG. 2B is another schematic illustration of a possible subset of the example process flow of FIG. 2A for automated quote generation and order management for building products in accordance with one or more example embodiments of the disclosure.

With reference to FIG. 2B, optional block 260 is illustrated therein as well, along with further steps that may be executed by computer-executable instructions stored on a memory of a device, such as a remote server or a user device, according to certain embodiments. Specifically, at optional block 262, a message or indication of a user accepting an option to purchase may be received, based upon either a two-click or two-interaction option, a buy-now option, or otherwise. In the moment of acceptance or substantially around the same, according to certain embodiments, this step may be executed by the computer-executable instructions to dynamically assess the original quote to determine any updates that may be required. For example, in the moment of acceptance, the system processor, executed by the computer-executable instructions, can individually or bulk update one or more of expiration dates, price, volume, or availability, relative to preset and/or custom parameters or the like. As detailed elsewhere herein, the (first or second) machine learning algorithm and associated probabilistic model(s) can also be further updated according to dynamic adjustments made in this manner, so as to predict and/or otherwise proactively manage dynamic updates in the moment of acceptance.

Thus, following optional block 262, the system processor, executed by the computer-executable instructions according to various embodiments, can generate and provide, in step or block 264, the updated parameters and/or quote to the user and monitor status thereof, for example to determine whether the user takes any additional action in real-time or otherwise upon the dynamically updated quote. In block 266, acceptance, rejection, and/or expiration of the dynamically updated quote may be confirmed according to various embodiments. The process may thus flow to optional block 270, as described immediately below.

As illustrated in both FIGS. 2A-B, at optional block 270 computer-executable instructions stored on a memory of a device, such as a remote server or a user device, may be executed to generate an updated training dataset for the first machine learning algorithm based at least in part on the selection of the purchase option. For example, one or more machine learning modules at a remote server may be configured to generate an updated training dataset for the first machine learning algorithm based at least in part on the selection of the purchase option. The updated training dataset may include data related to the quote, such as the length of time between when the message was sent and/or opened and the time the purchase option was selected, the first price value, the difference between the first price value and the estimated customer alternative price values, contextual data, available inventory at the time the quote was generated and/or the time the purchase option was selected, and/or other data. The updated training dataset may be used to tune the first machine learning algorithm to generate price values that are more likely to be converted to purchases over time.

At optional block 280 computer-executable instructions stored on a memory of a device, such as a remote server or a user device, may be executed to retrain the first machine learning algorithm using the updated training dataset. For example, one or more machine learning modules at a remote server may be configured to retrain the first machine learning algorithm using the updated training dataset. In this manner, the first machine learning algorithm may be configured to determine factors or features of datasets that lead to increases or decreases in probability of purchase as a result of price values and may output price values more efficiently for increased rates of conversion.

Figure 3:
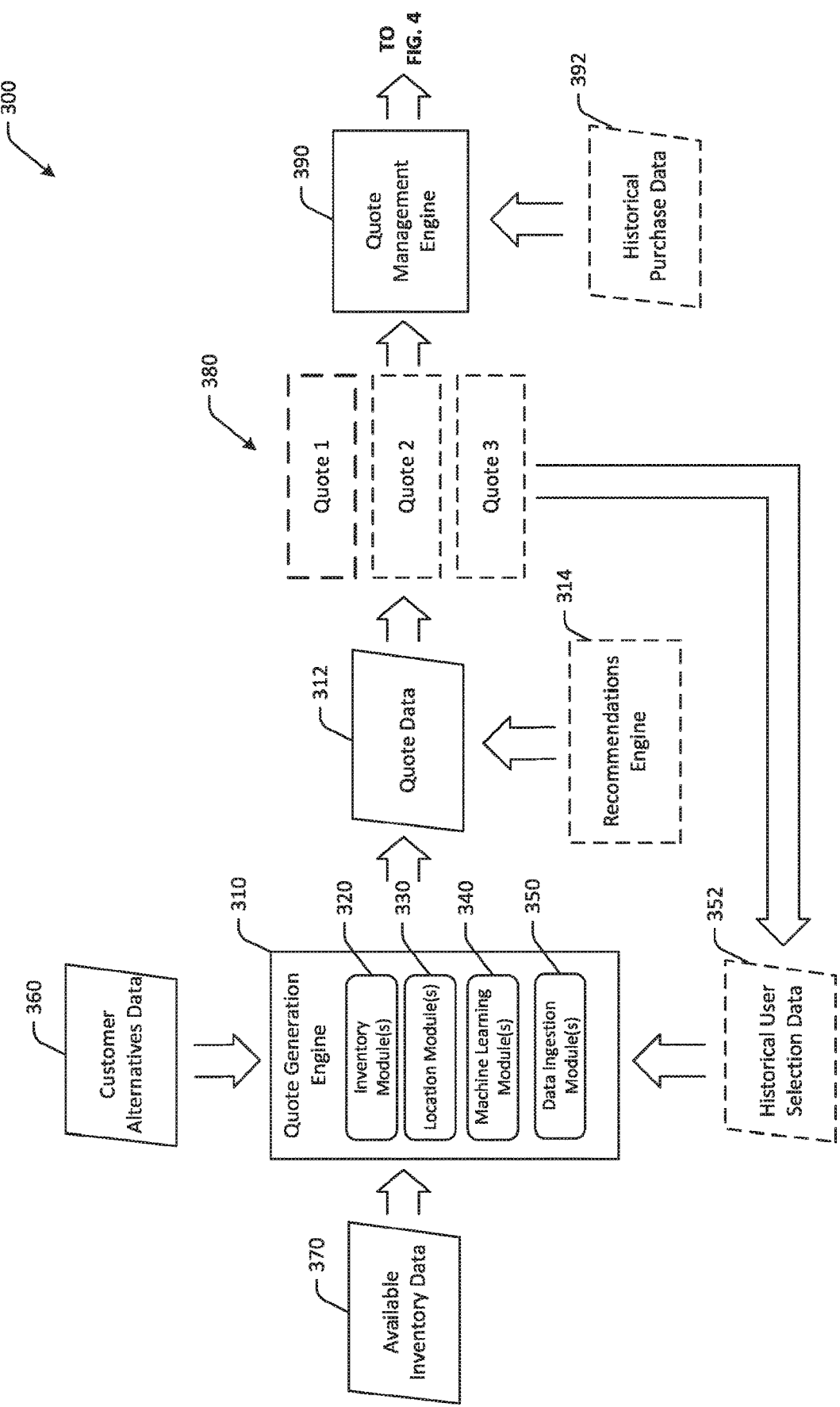
FIG. 3 is a schematic illustration of an example data flow for automated quote generation and order management for building products using machine learning in accordance with one or more example embodiments of the disclosure.

FIG. 3 is a schematic illustration of an example data flow 300 for automated quote generation and order management for building products using machine learning in accordance with one or more example embodiments of the disclosure. Different embodiments may include different, additional, or fewer inputs or outputs than those illustrated in the example of FIG. 3. Other embodiments may have a different number of machine learning algorithms and/or may separately segment the functionality of the machine learning algorithms depicted in the example of FIG. 3.

In FIG. 3, an example data flow 300 is schematically depicted. A quote generation engine 310 and/or one or more quote generation module(s) may be configured to generate quote data 312, which may include a quote or price value for one or more building products. The quote generation engine 310 may be stored at and/or executed by one or more remote servers. The quote generation engine 310 may include one or more modules or algorithms and may be configured to identify or determine the presence of one or more features in bulk data, to generate quote data 312 that satisfies a certain threshold probability or likelihood of purchase.

For example, the quote generation engine 310 may include one or more inventory module(s) 320, one or more location module(s) 330, one or more machine learning module(s) 340, and/or one or more data ingestion module(s) 350. Additional or fewer, or different, modules may be included. The inventory module(s) 320 may be configured to retrieve, process, and/or analyze inventory data for available inventory for which a requested building product. For example, the inventory module(s) 320 may be configured to determine whether inventory of a certain building product is available using one or more databases. The inventory module(s) 320 may be configured to determine a location of the available inventory, and in some embodiments, a distance between the location of the available inventory and a delivery destination associated with a quote. In some embodiments, the inventory module(s) 320 may be configured to determine estimated available inventory for one or more competitors, or via win/loss or hit rate analysis for a product and geographic destination, and/or one or more application programming interfaces or calls, if the information is publicly accessible and available. Accordingly, the inventory module(s) 320 may include data processing algorithms that can be used to identify or determine whether inventory is available and, if so, the amount of available inventory.

The location module(s) 330 may be configured to determine a location of available inventory and may be configured to determine whether available inventory is within a predetermined distance of a delivery destination associated with a building product request. In some embodiments, the location module(s) 330 may be configured to determine shipping costs associated with delivery of an order, where the shipping costs may be included in a quote.

The machine learning module(s) 340 may be configured to execute one or more machine learning algorithms to generate quotes (including price values) for building product quote requests and may be configured to determine a likelihood that a certain quote will be converted to a purchase. In some embodiments, the machine learning module(s) 340 may be configured to implement one or more machine learning algorithms or other deep learning techniques to generate one or more outputs. For example, the machine learning module(s) 340 may be configured to execute a first machine learning algorithm to determine a price value, and a second machine learning algorithm to determine a probability of conversion. The combination of outputs may be used to automate order management, as discussed with respect to FIG. 4.

In some embodiments, the machine learning module(s) 340 may be configured to generate training datasets to train or retrain one or more machine learning algorithms, which may include or otherwise be used in conjunction with one or more neural networks. For example, signal feedback from one or more sources may be received by the machine learning module(s) 340, and may be used to generate a training dataset that can be used to retrain one or more machine learning models to improve outputs of price values, probability of conversion, accuracy, and/or other metrics. In some instances, the machine learning module(s) 340 may be configured to generate one or more vectors representing factors considered to generate a price value and/or a probability value.

The data ingestion module(s) 350 may be configured to receive and process incoming data at the quote generation engine 310. For example, the data ingestion module(s) 350 may be configured to request and/or receive one or more feedback signals related to conversion of a quote via a message, as well as contextual signals including timing data, elapsed time since quote, number of times a quote has been viewed, available inventory at the time of conversion, estimated competitor inventory at the time of conversion, and/or other signals. Such ingested data may be used to generate training data for the one or more machine learning models. The data ingestion module(s) 350 may be configured to generate one or more vectors representing characteristics of incoming signals, which may be passed to the machine learning module(s) 340. In some instances, the data ingestion module(s) 350 may be configured to extract segments of data from larger files, such as bulk data batches, for further processing.

The quote generation engine 310 may receive one or more inputs that may be used to generate a quote responsive to a request for a quote for a particular building product. For example, the quote generation engine 310 may receive one or more of customer alternatives data 360 associated with pricing for the requested building product by one or more competitors, available inventory data 370 associated with inventory of the building product (which may also include customer alternatives data), and may optionally receive historical user selection data 352 associated with conversion events of one or more quotes generated by the quote generation engine 310. In some embodiments, the estimated customer alternative pricing or estimated customer alternative pricing data 360 may be extracted from a data file, where the data file includes data that is publicly accessible and discoverable. In other instances, the customer alternatives data 360 may be determined in or near real time. The estimated customer alternatives data 360 may include pricing for individual units of the building product, the complete amount of the desired building product, shipping or delivery costs, and/or other values. The estimated customer alternatives data 360 may be used to generate an estimate based on available data or an exact value based on the available data. For example, the machine learning module(s) 340 may process the estimated customer alternatives data 360 to determine a price value that is within a threshold difference from the estimated customer alternatives data 360.

The available inventory data 370 may be data related to inventory across all fulfillment centers, across fulfillment centers within a distance of a delivery destination, or at another set of fulfillment centers. The available inventory data 370 may be determined using one or more databases reflecting unsold inventory, inventory coming available or to be produced, or other types of inventory (possible product substitution). In some embodiments, the available inventory data 370 may be determined by retrieving production data from one or more mills or other production sites. For example, the inventory module(s) 320 may be configured to use the available inventory data 370 to determine whether inventory is available, a location of the inventory, whether estimated competitor inventory is available, and so forth.

The optional historical user selection data 352 may be used to optimize performance of the quote generation engine 310 over time. For example, the historical user selection data 352 may include conversion events, data associated with the conversion events, as described above, and/or other data that may be used to generate a training dataset for one or more machine learning algorithms. The machine learning module(s) 340 may be configured to utilize the training datasets to improve performance, as defined by accuracy of outputs generated by the various machine learning algorithms. The data ingestion module(s) 350 may use the historical user selection data 352 to coordinate retrieval of contextual information, such as available competitor inventory at the time of conversion, that can be used to generate the training datasets.

The quote generation engine 310 may process the respective data associated with the request for quote for a building product. For example, the estimated customer alternatives data 360 and the available inventory data 370 may be processed using one or more of the inventory module(s) 320, the location module(s) 330, and/or the machine learning module(s) 340. Likewise, the optional historical user selection data 352 may be processed using one or more of the modules or algorithms of the quote generation engine 310, such as the data ingestion module(s) 350.

Using one or more algorithms or modules, the quote generation engine 310 may determine one or more price values for the quote and may output quote data 312. The quote data 312 may include one or more vectors that represent the features of the factors used to generate a price value, as well as metadata related to the request for quote. The quote data 312 may include one or more price values generated in response to a request for quote. For example, the quote data 312 may include a first price value for a same day delivery, a second price value for a next day delivery, and so forth. The quote data 312 may include one or more quotes 380 for one or more building products. For example, a request for quote may be for a single building product or for multiple building products, and the quote data 312 may therefore include one or more quotes. Individual quotes are represented in FIG. 3 with dashed lines as Quote 1, Quote 2, Quote 3, etc. Any number of quotes may be generated.

In some embodiments, an optional recommendations engine 314 may be configured to generate recommendations of products that can be included with the respective quotes of the quote data 312. For example, the recommendations engine 314 may be configured to generate suggestions for related products based on customer requests. Such recommendations may be determined based at least in part on excess available inventory, such that inventory to be cleared could be provided at discounted pricing. In some instances, the recommendations engine 314 may be configured to identify customers that make consistent and/or repeated purchases, and/or purchase higher margin goods, and based on recent purchases by the customers, discounted clearance items can be provided to such customers either as part of a quote, or as a separate offer. Because inventory may be limited, the offers for such products may be provided sequentially to a ranked order of customers, where the customers may be ranked based at least in part on time of quote requests, most recent purchase data, likelihood of purchase metrics, customer profitability, frequency of purchase, breadth of products purchased, total volume purchased, and/or other factors.

A user may select one or more of the quotes. For example, the quote(s) may be sent to the user in one or more messages, and the user may accept the quote directly via the message. In the example of FIG. 3, the user may accept Quote 1, such as via a one-click or one-interaction purchase option in a message. Quote 1 is accordingly indicated with bold dashed lines. The selection of Quote 1, or the conversion event, may be captured and stored as historical user selection data 352. Metadata, such as a date and time of conversion, a device type at which conversion occurred, and/or other metadata may be included in the historical user selection data 352. The historical user selection data 352 may be fed back to the quote generation engine 310 to complete a feedback loop.

The set of one or more quotes 380 may be input at a quote management engine 390. The quote management engine 390 may be configured to manage one or more outstanding quotes generated by the quote generation engine 310 across some or all users. For example, the quote management engine 390 may be configured to determine whether to extend or shorten quote expiration times, determine dynamic quote expiration times, determine a total exposure based on generated quotes, dynamically adjust price or product availability, and so forth. The quote management engine 390 may optionally use one or more machine learning algorithms to generate and/or implement quote management actions. In some embodiments, the quote management engine 390 may be configured to automatically manage outstanding quotes to prevent overselling inventory, reduce potential inventory conflicts or over-allocation, and reduce overall exposure. The quote management engine 390 may receive one or more inputs, such as optional historical purchase data 392, which may be indicative of historical sales volumes of particular building products by particular users, that may be used to determine whether any order management actions are to be implemented. The quote management engine 390 may output one or more order management actions that may be implemented automatically by the quote management engine 390 or another component, as discussed with respect to FIG. 4.

The quote management engine 390 may, in some embodiments, output one or more order management recommendations or actions. In some embodiments, the quote management engine 390 may generate respective confidence scores or probability values indicating a likelihood that a quote will be converted. The confidence score or probability value may be dynamic over time, and may increase or decrease as time elapses. For example, probability values may increase up to 48 hours after the quote is generated, and then decrease thereafter. The probability value determination may be tuned over time based on actual conversion data.

Figure 4:
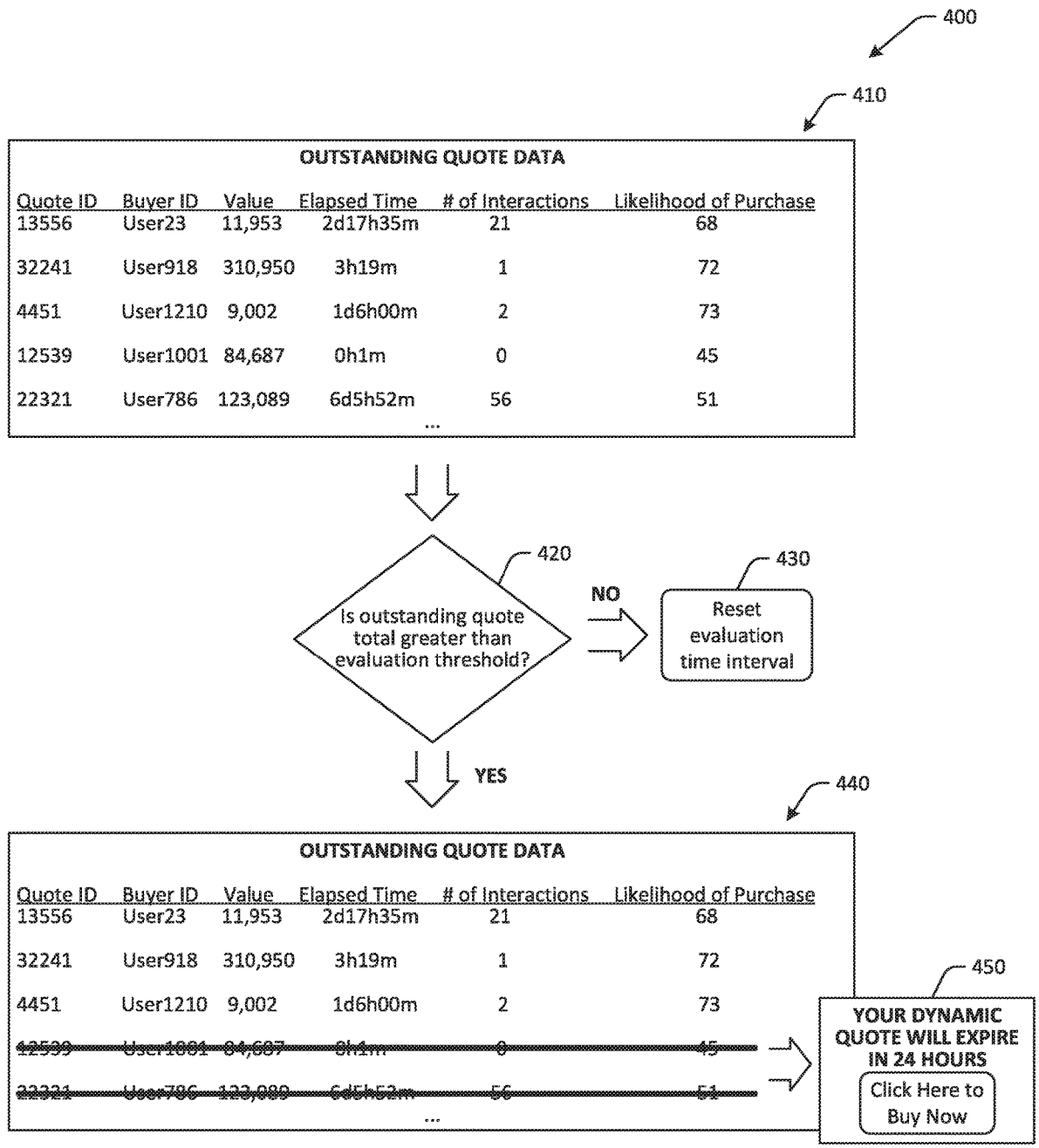
FIG. 4 is a schematic illustration of example automated implementation of order management actions in accordance with one or more example embodiments of the disclosure.

FIG. 4 is a schematic illustration of an example automated implementation of order management actions 400 in accordance with one or more example embodiments of the disclosure. In FIG. 4, outstanding quote data 410 is represented in a table format. The outstanding quote data 410 may include quotes generated by one or more quote generation engines. The outstanding quote data 410 may include metadata associated with the quotes. The outstanding quote data 410 may reflect quotes that have been generated, but have not yet been accepted, rejected, or expired. The outstanding quote data 410 may represent an amount of exposure for a certain product and/or system wide for quotes that have been generated by the system. For example, if a building product is particularly product during a certain season or time of the year, there may be an increased number of quote requests at certain times of the year, which may increase exposure and add risk of overselling and/or complicating logistics of delivery.

In the example of FIG. 4, the outstanding quote data 410 may include a number of quotes for a particular building product, such as a certain lumber product. The outstanding quote data 410 may include respective quote identifiers, buyer or user identifiers, a value or price associated with the quote, an elapsed time since the quote was generated, a number of interactions the user had with the quote and/or a related site, a likelihood of purchase value, market activity since quote generation, and/or other data. Other embodiments may include additional or fewer pieces of data. The likelihood of purchase value for the respective quotes may change over time. For example, an increase in user interactions with the quote (e.g., opening the quote, etc.) may indicate increased interest and/or likelihood of purchase. The outstanding quote data 410 may be updated over time as new quotes are generated, as quotes are accepted or rejected, and as quotes expire.

A quote management engine may ingest or otherwise monitor the outstanding quote data 410 to determine, at a determination block 420, whether the outstanding quote total is greater than an evaluation threshold. For example, the quote management engine may determine, in one embodiment, whether the total dollar amount of the building product across all outstanding quotes is greater than an evaluation threshold. The evaluation threshold may be a dollar amount above which an evaluation is triggered to decide which of the outstanding quotes is to be canceled, which expiration times are to be shortened or extended, and/or other actions including price or product availability adjustments for implementation. In other embodiments, instead of a dollar amount, the amount of product for which quotes have been generated (e.g., the number of units that may be sold, etc.) may be used to determine whether the evaluation threshold is satisfied (where the evaluation threshold is a percentage of inventory, an absolute number of units, etc.). In other embodiments, other metrics such as average elapsed time and/or changes in market activity or sales strategy may be used to determine whether the evaluation threshold is satisfied. In other embodiments, the evaluation threshold may be a time-based threshold. For example, evaluation may be triggered periodically, such as every 24 hours. The quote management engine may generate updated likelihood of purchase values independently in some embodiments.

If it is determined at determination block that the outstanding quote total is not greater than the evaluation threshold, the quote management engine may reset the evaluation time interval at block 430. The quote management engine may then evaluate the outstanding quote data at a later time.

If it is determined at determination block that the outstanding quote total is greater than, or otherwise satisfies, the evaluation threshold, the quote management engine may automatically implement one or more dynamic quote management actions. For example, the quote management engine may generate updated outstanding quote data 440 that reflects a change in expiration time for two of the outstanding quotes. For example, the quote management engine may determine that the two quotes with the lowest likelihood of purchase are to be canceled or are to have a shortened expiration time. The quote management engine may generate an automated message 450 indicating that the two quotes will expire in 24 hours (or another timeframe), so as to reduce the exposure while at the same time providing the user an opportunity to accept the quote.

In some embodiments, the quote management engine may implement one or more machine learning algorithms to automate the bulk cancelation process or bulk order management process. For example, the quote management engine may determine a set of unexpired quotes or outstanding quotes that were generated using a first machine learning algorithm and/or a quote generation engine, and may select, using a second machine learning algorithm or otherwise, a subset of the unexpired quotes to automatically expire or to shorten an expiration time frame. Expiration times for quotes may therefore be dynamic expiration times. Price values for quotes may similarly be considered dynamic price values, which may be adjusted prior to or in the moment of acceptance—or otherwise—so as to account for market conditions or the like. As with the expiration times, the quote management engine's one or more machine learning algorithms may automate a dynamic assessment of various parameters or conditions, which may influence the adjustment (upwards or downwards) of price values, alongside or independent of expiration time adjustments.

To select quotes to expire or otherwise reduce time of validity, the quote management engine may use a machine learning algorithm that is configured to determine, for some or each of the set of unexpired quotes, (i) an elapsed time since generation, (ii) a relative value ranking, and (iii) a likelihood of purchase. The second machine learning algorithm may be configured to determine the likelihood of purchase by: determining a product type of the first building product, determining historical sales data associated with the product type.

Figure 5:
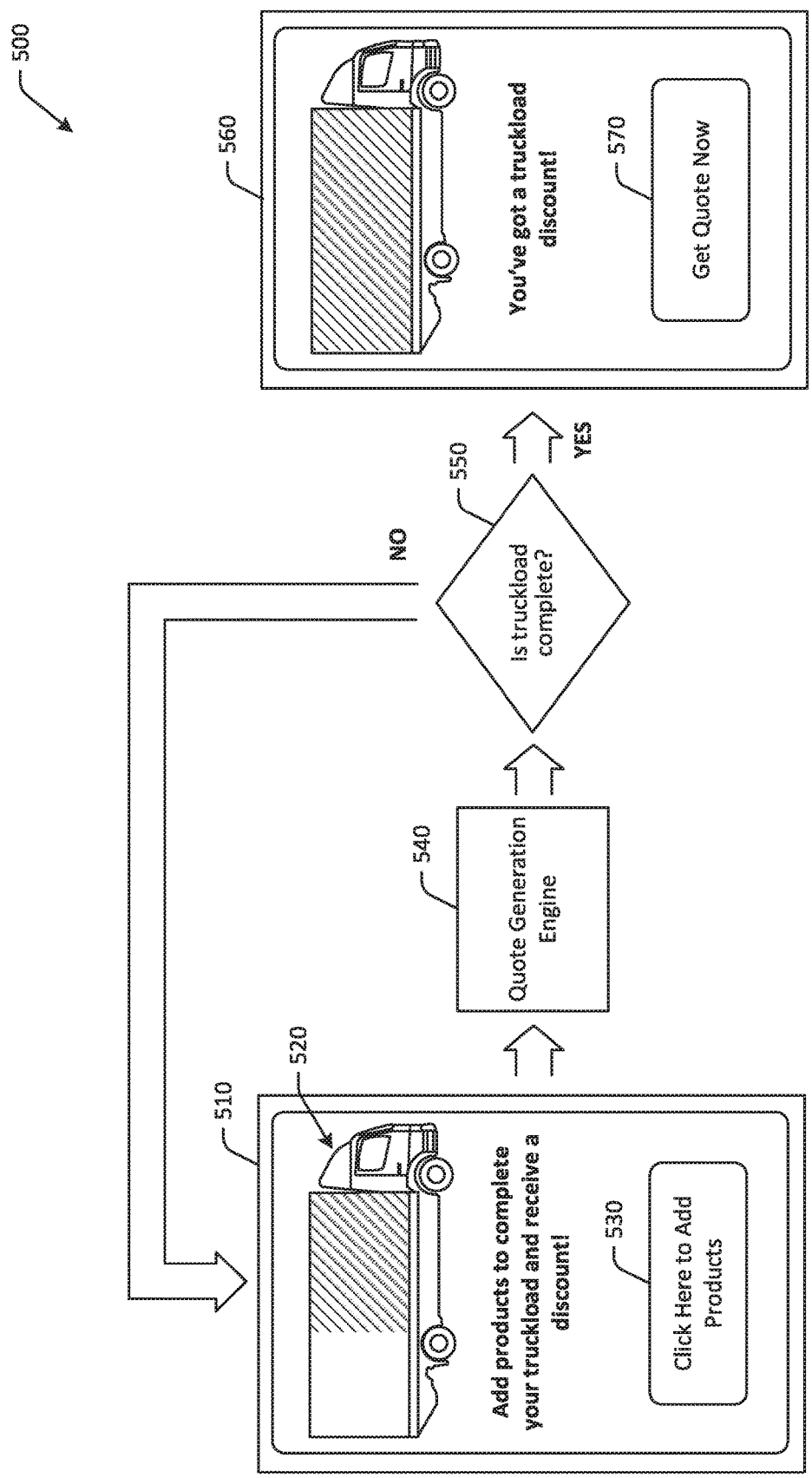
FIG. 5 is a schematic illustration of an example use case for using machine learning to generate pricing values in accordance with one or more example embodiments of the disclosure.

FIG. 5 is a schematic illustration of an example use case 500 for using machine learning to generate pricing values in accordance with one or more example embodiments of the disclosure. Other embodiments may include different user interfaces than those illustrated in the example of FIG. 5. The example process flow of FIG. 5 is simplified for illustrative purposes and may be implemented across one or more computer systems.

In FIG. 5, a first user interface 520 may be presented at a user device 510. For example, the first user interface 520 may be presented as part of a quote request generation process or may be presented when a user is attempting to request a quote for one or more building products. In some embodiments, discounts or other promotions may be provided if a user orders an amount of a building product, or a total amount of all products, that fills a truckload or other vehicle, as the entire shipment may be delivered to a single destination for the user. This may reduce shipping and/or transportation costs, which may result in savings for the user. To communicate this to the user, some embodiments may include graphical representations of a truckload or other vehicle that is occupied by the current products in a user's cart, which may assist the user in determining whether additional products or an additional amount of the same product is needed. The graphical representation may be generated by a remote server in communication with the user device 510. As depicted in FIG. 5, the first user interface 520 may indicate to the user that a completed truckload or other vehicle may result in a discounted price for the user. The first user interface 520 may include a selectable option 530 to include additional product. In some embodiments, instead of providing a discounted price for a completed truckload, a premium may be charged for a less than completed truckload (e.g., such as instances where an exact quantity or just in time delivery is required, etc.).

User additions to the quote may be sent to a quote generation engine 540. The quote generation engine 540 may consider the added product(s) or quantity to generate an updated quote and to provide additional discounts. The quote generation engine 540 may be configured to make a determination at determination block 550 as to whether the truckload (or other vehicle or total amount, which may be a bulk tally of more than one truck, but perhaps not a single full truck) is complete. If not, the process may return to the first user interface 520 with an updated graphical representation. The user may then have another opportunity to add product or increase an amount of product if desired. This may be completed or updated in real time, or at a later time dependent on user applications. If the truckload or multiple truckloads are full or complete, and the determination at determination block 550 is complete, the server may generate a second user interface 560 that indicates a discount has been received and/or the truckload is complete. The graphical representation may indicate a completed truckload. The second user interface 560 may include a selectable option 570 to retrieve a quote and/or accept a quote that has been presented. Acceptance of the quote may trigger fulfillment of an order of the products.

In some embodiments, a remote server may determine that a portion of a delivery truck to be occupied by the first building product is greater than a threshold prior to initiating the truckload discount process. For example, if the user is requesting a quote for product that will occupy less than 5% of a truckload, the user may not be interested in a truckload and the process may be bypassed. However, if the user is requesting a quote for product that will occupy 75% of a truckload, the user may be interested in a truckload discount and the process may be implemented. The server may determine an amount of the first building product or a second building product that can fit in an unoccupied portion of the delivery truck, and may determine a discounted price value for the amount of a first building product or a second building product due to the truckload discount. Truckload discount offers may be communicated via a message or another user interface.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented or may not necessarily need to be performed at all, according to some embodiments. Further, additional components and/ or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

3. Illustrative Device Architecture

Figure 6:
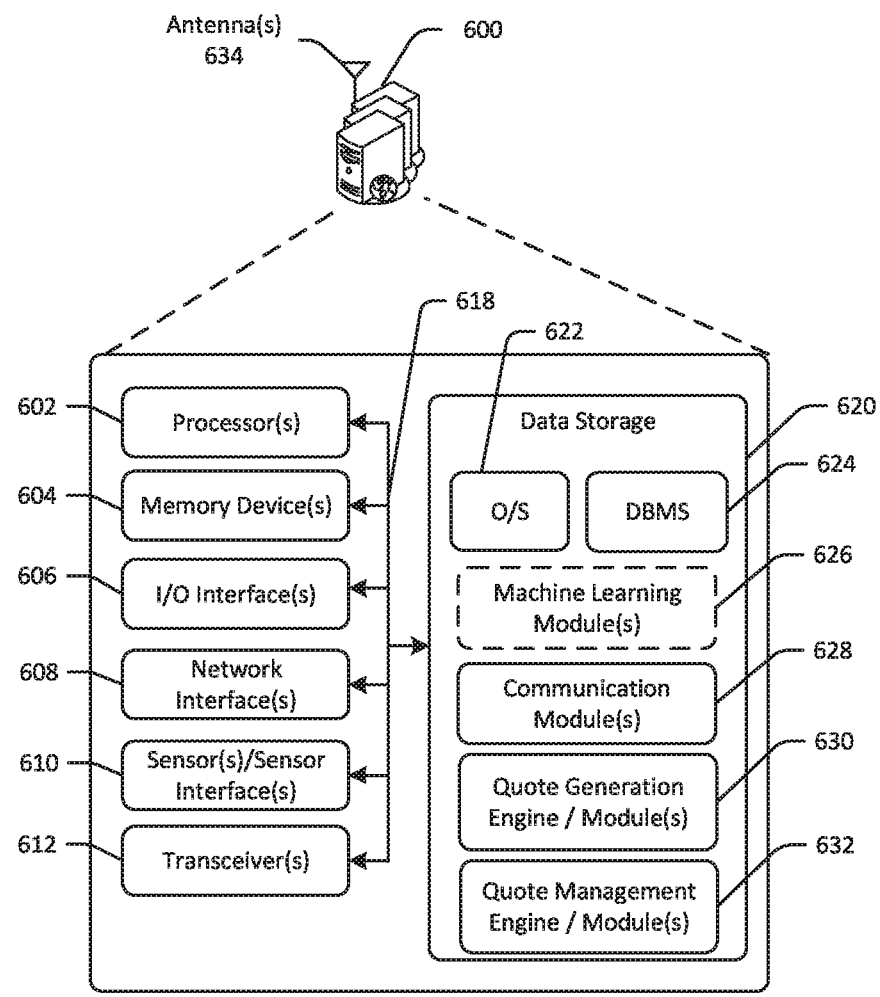
FIG. 6 is a schematic block diagram of an illustrative device in accordance with one or more example embodiments of the disclosure.

FIG. 6 is a schematic block diagram of an illustrative remote server 600 in accordance with one or more example embodiments of the disclosure. The remote server 600 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 600 may correspond to an illustrative device configuration for the devices of FIGS. 1-5.

The remote server 600 may be configured to communicate via one or more networks with one or more servers, user devices, or the like. In some embodiments, a single remote server or single group of remote servers may be configured to perform more than one type of quote generation and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 600 may include one or more processors (processor(s)) 602, one or more memory devices 604 (referred to herein as memory 604), one or more input/output (I/O) interface(s) 606, one or more network interface(s) 608, one or more sensors or sensor interface(s) 610, one or more transceivers 612, and data storage 620. The remote server 600 may further include one or more buses 618 that functionally couple various components of the remote server 600. The remote server 600 may further include one or more antenna(s) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the remote server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server 600 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more optional machine learning module(s) 626, one or more communication module(s) 628, one or more quote generation engine(s)/module(s) 630, and/or one or more quote management engine(s)/module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the remote server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, machine learning model training information, historical pricing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the optional machine learning module(s) 626 may include computer-executable instructions, code, or the like that responsive to execution by one or more of the processor(s) 602 may perform functions including, but not limited to, determining quotes or pricing values, determining confidence values, determining probability metrics, determining subsequent pricing values based on previous accepted or rejected quotes, determining inventory data, determining or detecting actions and/events, generating one or more machine learning models or algorithms, determining or classifying orders or quotes, and the like.

The communication module(s) 628 may include computer-executable instructions, code, or the like that responsive to execution by one or more of the processor(s) 602 may perform functions including, but not limited to, communicating with one or more devices, for example, via wired or wireless communication, communicating with remote servers, communicating with remote datastores, sending or receiving notifications or other messages, communicating with cache memory data, communicating with user devices, and the like.

The quote generation engine(s)/module(s) 630 may include computer-executable instructions, code, or the like that responsive to execution by one or more of the processor(s) 602 may perform functions including, but not limited to, generating quotes or pricing values, determining inventory amounts, determining shipping costs, determining competitor pricing, determining competitor delivery availability, determining expiration times and/or quote validity time intervals, and the like.

The quote management engine(s)/module(s) 632 may include computer-executable instructions, code, or the like that responsive to execution by one or more of the processor(s) 602 may perform functions including, but not limited to, determining dynamic quote expiration times, automatically canceling or withdrawing bids, generating notifications, providing bulk management user interfaces, and the like.

Referring now to other illustrative components depicted as being stored in the data storage 620, the O/S 622 may be loaded from the data storage 620 into the memory 604 and may provide an interface between other application software executing on the remote server 600 and hardware resources of the remote server 600. More specifically, the O/S 622 may include a set of computer-executable instructions for managing hardware resources of the remote server 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 600 is a mobile device, the DBMS 624 may be any suitable light-weight DBMS optimized for performance on a mobile device.

Referring now to other illustrative components of the remote server 600, the input/output (I/O) interface(s) 606 may facilitate the receipt of input information by the remote server 600 from one or more I/O devices as well as the output of information from the remote server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 600 may further include one or more network interface(s) 608 via which the remote server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(s) 634 may include any suitable type of antenna depending, for example, on the communications protocols used to transmit or receive signals via the antenna(s) 634. Non-limiting examples of suitable antennas may include directional antennas, non-directional antennas, dipole antennas, folded dipole antennas, patch antennas, multiple-input multiple-output (MIMO) antennas, or the like. The antenna(s) 634 may be communicatively coupled to one or more transceivers 612 or radio components to which or from which signals may be transmitted or received.

As previously described, the antenna(s) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 634 may be configured to transmit or receive radio frequency signals within any suitable frequency range forming part of the unlicensed portion of the radio spectrum.

The antenna(s) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 634—transmitting or receiving radio frequency (RF) signals in the bandwidth and/or channels corresponding to the communications protocols utilized by the remote server 600 to communicate with other devices. The transceiver(s) 612 may include hardware, software, and/or firmware for modulating, transmitting, or receiving—potentially in cooperation with any of antenna(s) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote server 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server 600 may include alternate and/or additional hardware, software, or firmware components beyond those described or depicted without departing from the scope of the disclosure. More particularly, it should be appreciated that software, firmware, or hardware components depicted as forming part of the remote server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

4. Conclusion

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. An apparatus comprising one or more processors and at least one non-transitory computer readable storage medium storing instructions that, with the one or more processors, cause the apparatus to:
   receive, via a first user interface configured for display via a user device, a quote request, wherein first electronic interactions with input elements of the first user interface cause updates to the first user interface, and wherein second electronic interactions with a submission element of the first user interface cause execution of a generation engine;
   execute the generation engine, wherein the generation engine is configured to:
     parse the quote request to extract one or more quote parameters comprising at least a product identifier and a desired quantity;
     query a plurality of repositories for one or more inventory indicators associated with the product identifier and a geographic identifier associated with the quote request, wherein each of the plurality of repositories is remote and updated in real time as transactions occur;
     determine, based at least in part the one or more quote parameters and the one or more inventory indicators, available inventory associated with the product identifier;
     identify, based at least in part on competitor identifiers associated with the product identifier, published electronic content;
     query public web addresses associated with the published electronic content to extract competitive market data;
     generate filtered competitive market data by filtering the competitive market data to eliminate competitive market data associated with competitor identifiers without inventory associated with the product identifier;
     generate, based at least in part on the filtered competitive market data, a set of alternative quote values for the product identifier;
     generate, using a second trained machine learning model, a transaction likelihood;
     input, to a first trained machine learning model, the available inventory, the transaction likelihood, and the set of alternative quote values; and
     obtain, from the first trained machine learning model, a first quote feature associated with the quote request and a confidence score associated with the first quote feature;
   generate, based at least in part on the first quote feature, a second user interface comprising a quote data object comprising the first quote feature, an expiration time, and an approval element, wherein the second user interface is configured for display via the user device, and wherein electronic interactions with the approval element cause the second user interface to update to a third user interface comprising a confirmation element; and
   cause transmission of the second user interface to the user device.

2. The apparatus of claim 1, wherein the at least one non-transitory computer readable storage medium storing instructions that, with the one or more processors, cause the apparatus to:
   receive an indication that the approval element was selected;
   generate an updated training dataset for the first trained machine learning model based at least in part on the quote data object; and
   retrain the first trained machine learning model using the updated training dataset.

3. The apparatus of claim 1, wherein the first trained machine learning model comprises one or more of neural networks, deep neural networks, long short term memory units, or recurrent neural networks.

4. The apparatus of claim 1, wherein the at least one non-transitory computer readable storage medium storing instructions that, with the one or more processors, cause the apparatus to:
   based at least in part on a duration of time elapsed since the transmission of the second user interface to the user device and a current network time, generate an updated confidence score associated with the first quote feature.

5. The apparatus of claim 1, wherein the at least one non-transitory computer readable storage medium storing instructions that, with the one or more processors, cause the apparatus to:
   determine a set of quote data objects that were generated using the first trained machine learning model and that are associated with expiration times that have not expired; and
   generate, using the second trained machine learning model, a subset of the set of quote data objects for which respective expiration times should be set to a current network time.

6. The apparatus of claim 5, wherein the second trained machine learning model is configured to determine, for each of the set of quote data objects, (i) an elapsed time since generation, (ii) a relative ranking, and (iii) a likelihood of acceptance.

7. The apparatus of claim 1, wherein the at least one non-transitory computer readable storage medium storing instructions that, with the one or more processors, cause the apparatus to:
   determine a set of quote data objects that were generated using the first trained machine learning model and that are associated with expiration times that have not expired; and
   for one or more of the set of quote data objects, generate, using the first trained machine learning model and based at least in part on updated data in the plurality of repositories, an updated first quote feature.

8. The apparatus of claim 7, wherein the at least one non-transitory computer readable storage medium storing instructions that, with the one or more processors, cause the apparatus to:
responsive to generating an updated first quote feature associated with a quote data object, cause transmission of an updated quote data object to the user device, wherein the updated quote data object comprises the updated first quote feature, an updated expiration time, and an approval element configured to trigger acceptance of the updated quote data object upon selection by the user device.

9. The apparatus of claim 1, wherein determining the available inventory of associated with the product identifier comprises determining available inventory within a predetermined distance of a geographic destination associated with the quote request.

10. The apparatus of claim 1, wherein the approval element is configured for one-interaction or two-interaction acceptances.

11. A non-transitory computer-readable storage medium storing computer-executable instructions that, when executed by one or more processors, cause the one or more processors to:
receive, via a first user interface configured for display via a user device, a quote request, wherein first electronic interactions with input elements of the first user interface cause updates to the first user interface, and wherein second electronic interactions with a submission element of the first user interface cause execution of a generation engine;
execute the generation engine, wherein the generation engine is configured to:
parse the quote request to extract one or more quote parameters comprising at least a product identifier and a desired quantity;
query a plurality of repositories for one or more inventory indicators associated with the product identifier and a geographic identifier associated with the quote request, wherein each of the plurality of repositories is remote and updated in real time as transactions occur;
determine, based at least in part the one or more quote parameters and the one or more inventory indicators, available inventory associated with the product identifier;
identify, based at least in part on competitor identifiers associated with the product identifier, published electronic content;
query public web addresses associated with the published electronic content to extract competitive market data;
generate filtered competitive market data by filtering the competitive market data to eliminate competitive market data associated with competitor identifiers without inventory associated with the product identifier;
generate, based at least in part on the filtered competitive market data, a set of alternative quote values for the product identifier;
generate, using a second trained machine learning model, a transaction likelihood;
input, to a first trained machine learning model, the available inventory, the transaction likelihood, and the set of alternative quote values; and
obtain, from the first trained machine learning model, a first quote feature associated with the quote request and a confidence score associated with the first quote feature;
generate, based at least in part on the first quote feature, a second user interface comprising a quote data object comprising the first quote feature, an expiration time, and an approval element, wherein the second user interface is configured for display via the user device, and wherein electronic interactions with the approval element cause the second user interface to update to a third user interface comprising a confirmation element; and
cause transmission of the second user interface to the user device.

12. The non-transitory computer-readable storage medium of claim 11, storing instructions that, with the one or more processors, cause the one or more processors to:
receive an indication that the approval element was selected;
generate an updated training dataset for the first trained machine learning model based at least in part on the quote data object; and
retrain the first trained machine learning model using the updated training dataset.

13. The non-transitory computer-readable storage medium of claim 11, wherein the first trained machine learning model comprises one or more of neural networks, deep neural networks, long short term memory units, or recurrent neural networks.

14. The non-transitory computer-readable storage medium of claim 11, storing instructions that, with the one or more processors, cause the one or more processors to:
based at least in part on a duration of time elapsed since the transmission of the quote data object to the user device and a current network time, generate an updated confidence score associated with the first quote feature.

15. The non-transitory computer-readable storage medium of claim 11, storing instructions that, with the one or more processors, cause the one or more processors to:
determine a set of quote data objects that were generated using the first trained machine learning model and that are associated with expiration times that have not expired; and
generate, using a second trained machine learning model, a subset of the set of quote data objects for which respective expiration times should be set to a current network time.

16. The non-transitory computer-readable storage medium of claim 15, wherein the second trained machine learning model is configured to determine, for each of the set of quote data objects, (i) an elapsed time since generation, (ii) a relative ranking, and (iii) a likelihood of acceptance.

17. The non-transitory computer-readable storage medium of claim 11, storing instructions that, with the one or more processors, cause the one or more processors to:
determine a set of quote data objects that were generated using the first trained machine learning model and that are associated with expiration times that have not expired; and
for one or more of the set of quote data objects, generate, using the first trained machine learning model and based at least in part on updated data in the plurality of repositories, an updated first quote feature.

18. The non-transitory computer-readable storage medium of claim 17, storing instructions that, with the one or more processors, cause the one or more processors to:

responsive to generating an updated first quote feature associated with a quote data object, cause transmission of an updated quote data object to the user device, wherein the updated quote data object comprises the updated first quote feature, an updated expiration time, and an approval element configured to trigger acceptance of the updated quote data object upon selection by the user device.

19. The non-transitory computer-readable storage medium of claim 11, wherein determining the available inventory of associated with the first product identifier comprises determining available inventory within a predetermined distance of a geographic destination associated with the quote request.

20. The non-transitory computer-readable storage medium of claim 11, wherein the approval element is configured for one-interaction or two-interaction acceptances.

* * * * *